Nov. 18, 1930.  F. S. McQUESTON  1,782,243
CUTTER SPINDLE
Filed Aug. 29, 1929
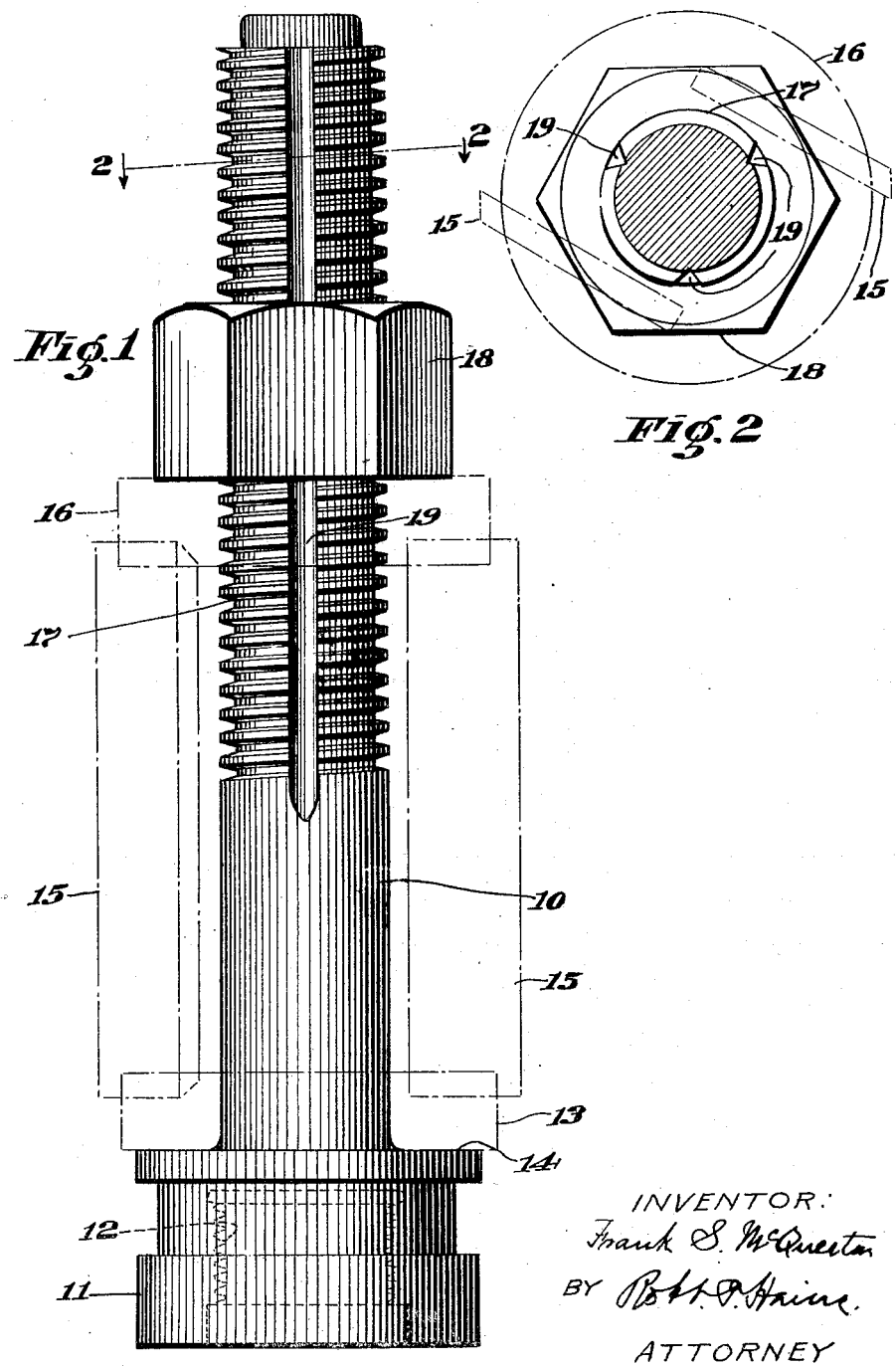
INVENTOR:
Frank S. McQueston
BY Robt. P. Haines
ATTORNEY Patented Nov. 18, 1930

1,782,243

UNITED STATES PATENT OFFICE

FRANK S. McQUESTON, OF WINCHENDON, MASSACHUSETTS, ASSIGNOR TO BAXTER D. WHITNEY & SON, INC., OF WINCHENDON, MASSACHUSETTS, A CORPORATION OF MASSACHUSETTS

CUTTER SPINDLE

Application filed August 29, 1929. Serial No. 389,132.

This invention relates to improved means for removably securing a cutter to a spindle, and more particularly to improvement in shaper spindles.

The means commonly employed to removably secure a cutter upon a spindle consists of a shoulder upon the spindle and a threaded portion adapted to receive a nut that serves to clamp the cutter between the shoulder and nut.

It is found in practice that the dust and foreign particles which lodge upon the threads of the clamping nut and spindle become confined between the cooperating threads to such an extent that they interfere with the free rotation of the nut upon the spindle and cause the cooperating threads to bind and cut each other until the threads become scored, thus making renewal of parts necessary or desirable.

The present invention is directed to a simple but effective expedient for overcoming this difficulty and relates to a cutter spindle having one or more slots provided lengthwise of the spindle to intersect the thread and form a clearance space or spaces into which the compact dust or foreign particles confined between the threads of the spindle and nut may escape. As a result of this construction dirt and foreign particles are prevented from accumulating between the cooperating threads and cutting and scoring of the threads is avoided.

The invention will be best understood from the following description when read in connection with the accompanying drawing illustrating one good practical form thereof.

In the drawing,—

Fig. 1 is a side elevation of the upper portion of a shaper spindle embodying the features of the present invention; and Fig. 2 is a sectional view taken on the line 2—2 of Fig. 1.

The invention is illustrated as applied to a well known type of shaper spindle, but it is applicable to various types of cutter spindles.

Wood shapers are commonly provided with a single vertical spindle or a pair of such spindles, and the spindles are driven by a belt or motor at high speed. These spindles are frequently formed in two parts consisting of a main portion (not shown) to which the power is applied, and having a threaded upper end, and an upper portion 10 having its lower end enlarged as at 11. This enlarged portion is internally threaded as at 12 to facilitate the attachment of the upper portion 10 of the spindle to the threaded upper end of the main body portion of the spindle.

The portion 10 of the spindle is adapted to receive a cutter or cutter head of any desired shape and the cutter or head may be provided with any suitable number of knives. In the construction shown the cutter or cutter head consists of a lower knife collar 13 adapted to rest upon the shoulder 14 of the spindle 10, a pair of knives 15, and an upper knife collar 16, the collars being slotted as shown to receive the knives 15.

The spindle 10 is shown as having an "acme" thread 17 but it may be provided with any other suitable thread, and upon the threaded portion is placed a nut 18 adapted to be screwed down tight upon the collar 16 to clamp the cutter parts firmly in place upon the driving spindle 10.

The construction so far described is well known in the shaper art and has been briefly set forth to make clear the associated feature of the present invention which will now be described.

It is found in practice that the dust from the wood working operations and other foreign particles which lodge on the threads of the nut and spindle tend to accumulate between the cooperating threads until they produce a binding action between the threads, which not only makes the nut hard to rotate upon the spindle, but subjects the cooperating threads of the nut 18 and spindle 10 to a cutting or scoring action.

Through the features of the present invention this difficulty is entirely overcome by providing the threaded portion of the spindle 10 with one or more longitudinally extending slot 19 formed to intersect the threads and produce one or more clearance spaces into which the foreign material confined between the cooperating threads may escape. In this manner the accumulation of dust or foreign material between the threads and the resulting binding action of the threads is prevented.

The number of clearance slots 19 provided may be varied as desired, three being shown in the drawing, and these slots preferably are equally spaced about the spindle as shown, to keep the spindle properly balanced.

The binding action between the nut and spindle caused by the accumulation of oil soaked dust and other particles between the cooperating threads has produced considerable trouble heretofore by producing a binding or cutting action between the cooperating threads of the nut and spindle. This difficulty, however, is entirely overcome through the provision of the clearance slot or slots in accordance with the present invention.

What is claimed is:—

A wood shaper spindle constructed to prevent dirt and dust from accumulating between the cooperating threads of the spindle and nut, comprising, a threaded spindle portion adapted to receive a cutter, and a nut for clamping the cutter upon the spindle, the threaded portion of the spindle being provided with a clearance slot formed longitudinally of the spindle to receive the compressed dirt and dust from between the cooperating threads and constructed so that its side walls converge towards the bottom of the slot.

In testimony whereof, I have signed my name to this specification.

FRANK S. McQUESTON.